Jan. 8, 1946.  P. F. ROSSMANN  2,392,506
WING FOLDING MEANS
Filed Sept. 14, 1942  2 Sheets-Sheet 1

INVENTOR
PETER F. ROSSMANN
BY
ATTORNEY

Patented Jan. 8, 1946

2,392,506

UNITED STATES PATENT OFFICE 2,392,506

WING FOLDING MEANS

Peter F. Rossmann, Snyder, N. Y., assignor to Curtiss-Wright Corporation, a corporation of Delaware Application September 14, 1942, Serial No. 458,324

5 Claims. (Cl. 244—49)

This invention relates to aircraft wherein the wing members are mounted so as to be extended or folded with respect to a fixed portion of the aircraft.

The problem of storing aircraft so that they will occupy a minimum of space has long been recognized, and various means have been provided for folding aircraft wings. Thus, it has been common practice to fold a portion of an aircraft wing along an axis parallel to a wing chord. In general, the means for so folding an aircraft wing may be divided into two classes, i. e., (1) those relying on mechanical links and levers, and (2) those relying on gearing. The disadvantage of links and levers is that in general the leverage will gradually increase or decrease as the wing is being folded while the necessary folding force is greatest at the beginning and end of the folding operation.

In a gearing system for folding an aircraft wing, the use of bevelled gears is general practice. Such a gearing system has the desirable factor of having a constant leverage but the leverage is limited by the pitch diameter of the gears within the limited wing space. The use of a worm and worm wheel drive for folding the wing is desirable because of its inherent large mechanical advantage. However, if the hinge axis of the wing is close to the surface of the wing and the worm wheel is mounted about the hinge axis, then it is not possible to obtain much more than a 90 degree folding movement of the wing if the worm wheel is to be completely enclosed within the wing. Since it is desirable to conserve vertical as well as horizontal space, the wing should be arranged to fold back on itself. Accordingly, it is an object of this invention to provide a worm gear drive for folding an aircraft wing in which the wing may be folded back on itself even though the axis of the worm wheel lies close to the surface of the wing. A further object of the invention is to provide a gear drive for folding an aircraft wing in which the gear system is confined within the wing and is so constructed that maximum gear radii may be used.

Specifically, it is an object of this invention to provide a gear drive for folding an aircraft wing wherein the worm wheel drives a planet pinion gear, and the pinion in turn drives an internal gear to fold the wing.

Other objects of the invention will become apparent in reading the annexed detailed description in connection with the drawings, in which.

Figure 2:
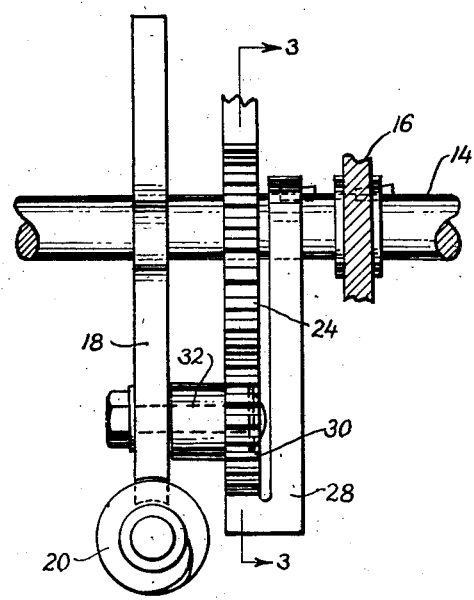
Fig. 2 is a section view along the line 2—2 of Fig. 1.
Figure 3:
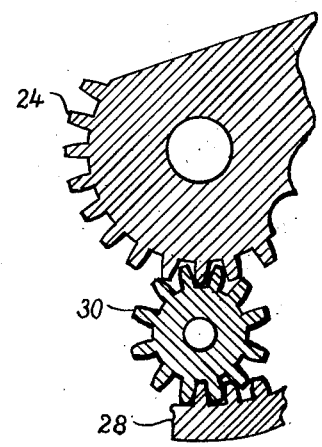
Fig. 3 is a section view along the line 3—3 of Fig. 2.
Figure 1:
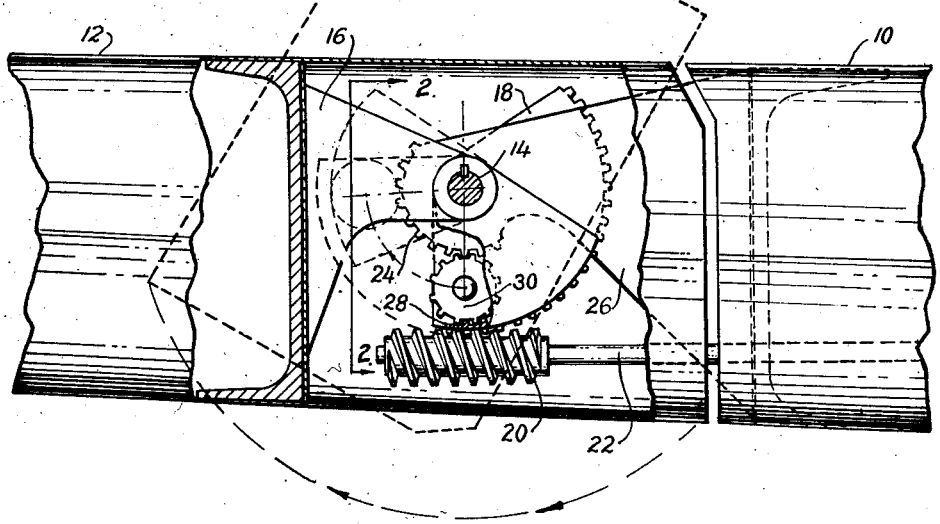
Fig. 1 is a front elevation of a foldable aircraft wing showing the gear drive for folding the wing.
Figure 4:
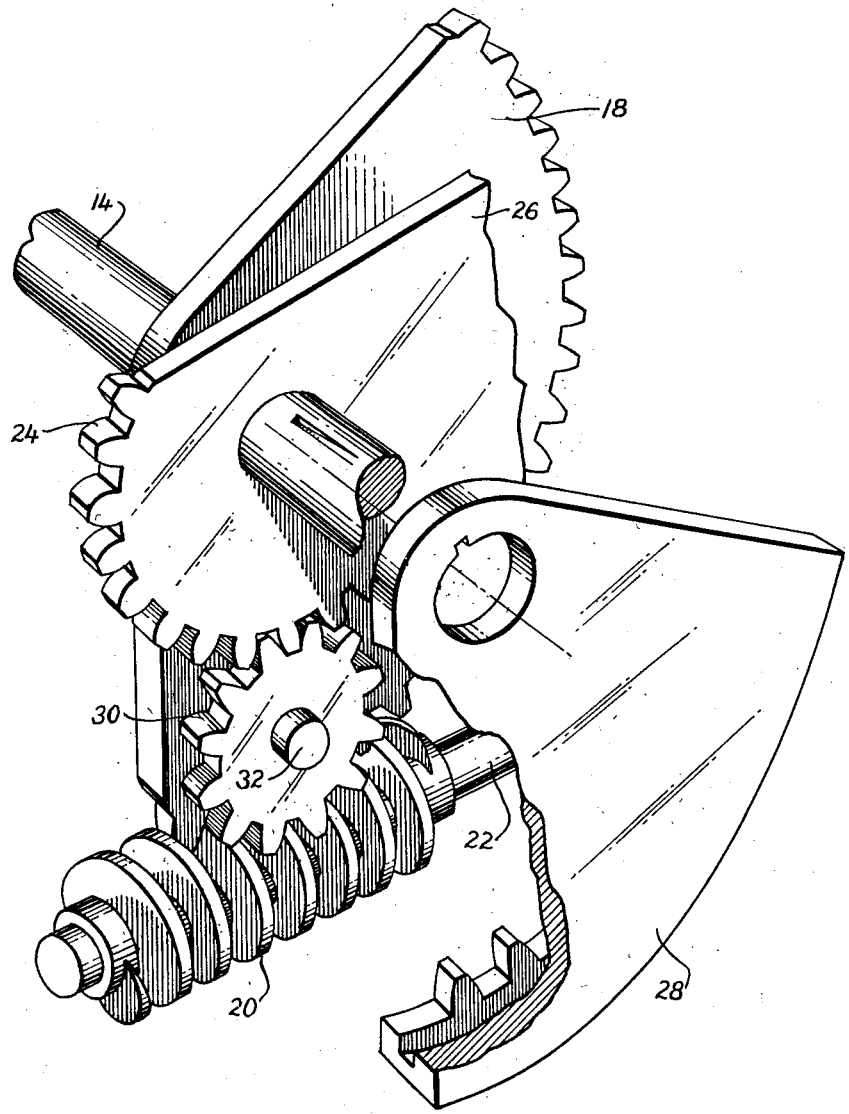
Fig. 4 is an exploded perspective view of the gear drive.

Referring to the drawings, an aircraft wing is divided into an inner wing part 10 and an outer wing part 12 hinged thereto so that the outer part may be folded, as indicated by the dotted lines in Fig. 1. A shaft 14 is non rotatably secured in brackets 16 carried by the outer wing part, this shaft 14 being substantially parallel to the wing chord. A worm wheel sector 18, rotatably mounted on the shaft 14, is drivably engaged by a worm gear 20 carried by a control shaft 22. The worm gear 20 and the control shaft 22 are carried by the inner wing part 10 by bearing means, not shown. The shaft 14 is journalled to the inner wing part 10, and the bracket 26, which is secured to the inner wing part, may form one of such journals for the shaft 14. A sun gear sector 24 is secured to or formed integral with this bracket 26 and an internal gear sector 28 is non rotatably secured to the shaft 14. A planet pinion gear 30, carried by the worm wheel sector 18 by means of a stub shaft 32, meshes with the sun gear sector 24 and the internal gear sector 28.

As a result of this construction, the shaft 14 is journaled to the inner wing part 10 and is non rotatably secured to the outer wing part 12. The sun gear sector 24 is fixed to the inner wing part 10 and since the internal gear sector 28 is non rotatably secured to the shaft 14, this gear sector 28 is fixed relative to the outer wing part 12. Consequently, through the coaction of pinion gear 30 with sun gear sector 24 and internal gear sector 28, rotation of the pinion 30 by the worm and worm wheel combination causes rotation of the internal gear sector 28 thereby to fold the outer wing part 12. Therefore, the operation of the device is as follows: Rotation of the control shaft 22 drives the worm wheel sector 18 about the shaft 14. This rotation of the worm wheel sector enforces rotation of the planet pinion gear 30 about the shaft 14 and since this pinion gear is meshed with the fixed sun gear sector 24 and internal gear sector 28, this rotation of the pinion will produce a rotation of internal gear 28 to fold the outer wing part, as illustrated by the dashed lines in Fig. 1.

It should be noted that in planetary gear system 24, 28 and 30, angular movement of pinion 30 about sun gear 24 produces an amplified angular movement of internal gear 28 as compared to angular movement of the worm wheel sector in the ratio of $$1+\frac{r}{R} \text{ to } 1$$

where $r$ is the pitch diameter on the sun gear 24, and R is the pitch diameter of the internal gear 28. The gear system 24, 28 and 30 thereby produces a movement of the outer wing part 12 which is amplified with respect to the movement of the worm wheel sector 18 so that approximately a 90 degree movement of the worm wheel provides ample folding of the wing. Thus, as a result of this amplification, neither the worm wheel sector nor the sun gear sector need be much greater than 90 degrees. Also, the relative movement between pinion 30 and internal gear sector 28 is limited to the extent that the gear system produces an amplified movement of this internal gear sector relative to that of the worm wheel. Consequently, the periphery of the internal gear sector 24 may be less than 90 degrees. Thus, except for the small pinion gear 28 and worm gear 20, the remaining gears 18, 24 and 28 are only limited sectors of complete circular gears. The gear system thereby permits the use of maximum gear radii within a relatively thin wing.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an aircraft having a foldable wing section, means to fold said wing section about an axis disposed relatively close to one surface of said wing, said means comprising a worm, a sector of a worm wheel drivably engaged by said worm and pivotally mounted about said axis, and gear means connected between said worm wheel sector and said foldable wing section adapted to effect an amplified motion of said foldable wing section with respect to that of said worm wheel sector.

2. In an aircraft having a foldable wing section, means to fold said wing section about an axis disposed substantially parallel to a wing chord and disposed relatively close to one surface of said wing, said means comprising a worm, a sector of a worm wheel drivably engaged by said worm and pivotally mounted about said axis, and gear means connected between said worm wheel sector and said foldable wing section adapted to effect an amplified motion of said foldable wing section with respect to that of said worm wheel sector.

3. In an aircraft having a foldable wing section, means to fold said wing section about an axis disposed relatively close to one surface of said wing, said means comprising a worm, a sector of a worm wheel drivably engaged by said worm and pivotally mounted about said axis, and planetary gear means interposed between said gear sector and said foldable wing section adapted to effect an amplified motion of said foldable wing section with respect to that of said gear sector, said planetary gear means including a planet pinion gear carried by said worm wheel sector.

4. In an aircraft having a foldable wing section, means to fold said wing section about an axis disposed relatively close to one surface of said wing, said means comprising a worm, a sector of a worm wheel drivably engaged by said worm and pivotally mounted about said axis, a first gear fixed to said aircraft co-axial with said axis, a second gear fixed to said foldable wing section co-axial with said axis, and a planet pinion gear carried by said worm wheel sector and connected between said first gear and internal gear, said first and second gears and planet pinion gear being arranged to effect an amplified motion of said second gear with respect to said worm wheel sector.

5. In an aircraft having a foldable wing section, means to fold said wing section about an axis disposed relatively close to one surface of said wing, said means comprising a shaft co-axial with said axis and non-rotatably secured to said foldable wing section, a worm, a worm wheel sector drivably engaged by said worm and mounted for rotation about said axis, a first gear fixed to said aircraft co-axial with said axis, a second gear fixed to said shaft, and a planet pinion gear carried by said worm wheel sector and connected between said first and second gears.

PETER F. ROSSMANN.